United States Patent
Wurm

(10) Patent No.: US 6,235,081 B1
(45) Date of Patent: May 22, 2001

(54) PROCESS FOR THE PRODUCTION OF SPONGY METAL

(75) Inventor: Johannes Wurm, Nebelberg (AT)

(73) Assignee: Voest-Alpine Industrieanlagenbau GmbH, Linz (AT)

( * ) Notice: Subject to any disclaimer, the term of this patent is extended or adjusted under 35 U.S.C. 154(b) by 0 days.

(21) Appl. No.: 09/125,450

(22) PCT Filed: Mar. 3, 1997

(86) PCT No.: PCT/AT97/00044

§ 371 Date: Aug. 19, 1998

§ 102(e) Date: Aug. 19, 1998

(87) PCT Pub. No.: WO97/33005

PCT Pub. Date: Sep. 12, 1997

(30) Foreign Application Priority Data

Mar. 5, 1996 (AT) ......................................... 414/96

(51) Int. Cl.[7] ................. C21B 13/02; C22B 5/00
(52) U.S. Cl. ................. 75/446; 75/450; 75/479; 75/487; 75/492
(58) Field of Search ..................... 75/446, 479, 487, 75/450, 468, 492

(56) References Cited

U.S. PATENT DOCUMENTS 2,653,088   9/1953   Pike .............................. 75/500
5,238,487 * 8/1993   Hauk et al. ..................... 75/492
5,676,732 * 10/1997  Viramontes-Brown et al. ........ 75/446

FOREIGN PATENT DOCUMENTS

| 396255B | 7/1993 | (AT) . |
| 2126803 | 12/1972 | (DE) . |
| 4037977 | 6/1992 | (DE) . |
| 2139958 | 1/1973 | (FR) . |
| 62-247018 | 10/1987 | (JP) . |
| 01129914 | 5/1989 | (JP) . |

* cited by examiner

Primary Examiner—Roy King
Assistant Examiner—Tima McGuthry-Banks
(74) Attorney, Agent, or Firm—Birch, Stewart, Kolasch & Birch, LLP

(57) ABSTRACT

A method for producing a sponge metal from metal ore or iron ore which comprises reacting said metal ore or iron ore in a reduction zone with a CO— and $H_2$-containing, reducing feed gas source which has been compressed, and after said reaction, withdrawing the remaining feed gas as an export gas from the reduction zone, wherein the CO— and $H_2$-containing feed gas is introduced into the reduction zone form at least to gas sources, whereby upon a breakdown of one of the feed gas sources, at least a portion of the export gas recovered from the reduction zone is compressed, subjected to $CO_2$ elimination recycled to the reduction zone together with the reducing feed gas.

10 Claims, 2 Drawing Sheets

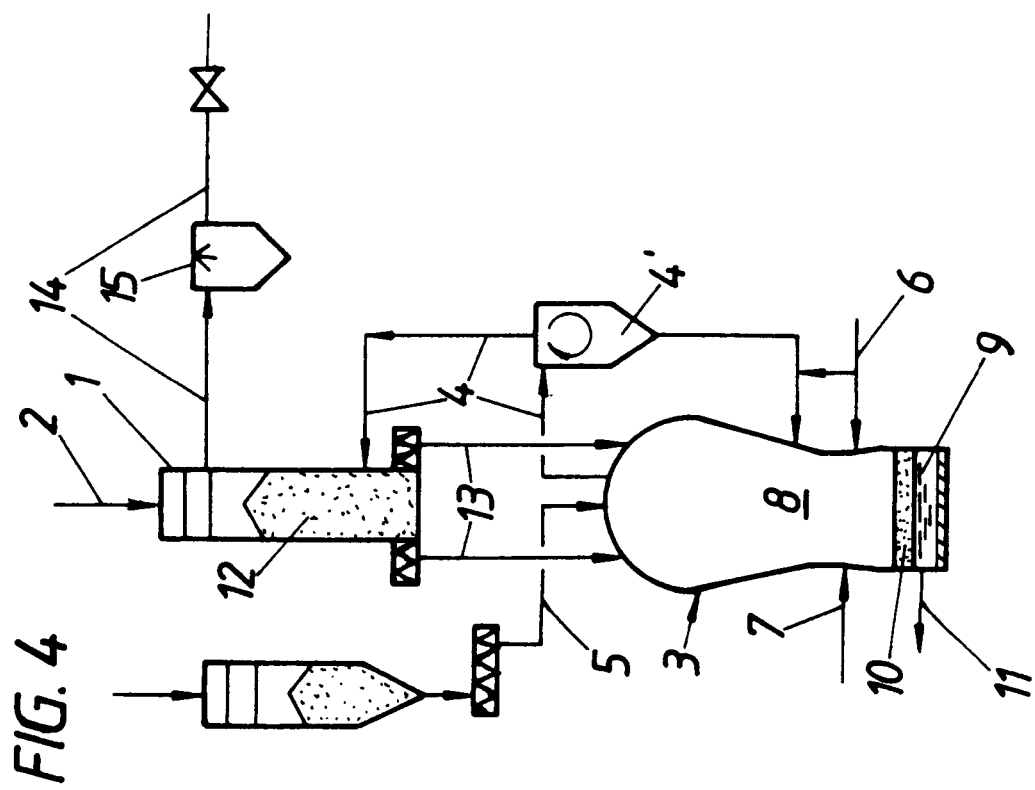

PROCESS FOR THE PRODUCTION OF SPONGY METAL

This application is the national phase under 35 U.S.C. §371 of prior PCT International Application No. PCT/AT97/00044 which has an International filing date of Dec. 15, 1997 which designated the United States of America, the entire contents of which are hereby incorporated by reference.

BACKGROUND OF THE INVENTION

The present invention relates to a method for producing sponge metal, in particular sponge iron, from charging materials consisting of metal ore or iron ore respectively, preferably in lumps and/or pellets, and optionally fluxes, wherein a CO— and $H_2$-containing feedgas from a gas source which is compressed and optionally subjected to $CO_2$ elimination and heating is supplied to a reduction zone to serve as a reducing gas and after reaction with the metal ore is withdrawn from the reduction zone as an export gas for further use by a consumer. The present invention is also directed to a plant for carrying out the method.

A method of this type is known from AT-B-396.255 and from DE-C-40 37 977. With these known methods, the gas source is formed by a first reduction zone, in which iron ore is directly reduced to sponge iron, wherein the sponge iron is melted in a meltdown gasifying zone under the supply of carbon carriers and oxygen-containing gas and a CO— and $H_2$containing reducing gas is produced which is fed to the first reduction zone, is reacted there and withdrawn as a feedgas for the further reduction zone. According to AT-B-396.255, the feedgas prior to being fed to the further reduction zone is subjected to $CO_2$ elimination by a reformer and at the same time is heated; in accordance with DE-C-40 37 977, $CO_2$ elimination is effected by a $CO_2$ scrubber.

With these known methods, export gas withdrawn from the further reduction zone is subjected to scrubbing and is subsequently mixed with the export gas from the first reduction zone, and the mixed gas thus formed is subjected to $CO_2$ elimination and heating. This gas mixture is then supplied to the further reduction process to serve as a reducing gas. It thereby becomes feasible to exploit a portion of the reductants still present in the export gas from the further reduction zone, as the export gas is supplied to the further reduction process as a recycle reducing gas.

Often, there is a requirement for the export gas from the further reduction zone to be available for an external consumer, f.i. as a fuel gas. The export gas from the further reduction zone will then not be recycled. In this case, provisions must therefore be made to ensure that a sufficient amount of reducing gas will be available at any time to enable steady operation of the reduction process. In particular, the supply to the further reduction zone of a sufficient amount of reducing gas is to be ensured even with different operating states of the entire plant, f.i. even in the event of a failure.

SUMMARY OF THE INVENTION

With a method of the initially described kind this object is achieved in that into the reduction zone a CO— and $H_2$-containing feedgas is fed from at least two gas sources to serve as a reducing gas and that a breakdown of one of the gas sources is compensated for by recycling at least a portion of the export gas from the reduction zone, wherein said export gas is subjected to compression, to $CO_2$ elimination and optionally to heating and is supplied to the reduction zone along with the feedgas from the other intact gas source(s).

The special feature of this method is that if at least two gas sources are provided, the direct reduction process in the further reduction zone can be continued even in case of a breakdown of one of the gas sources. Actually the breakdown of one of the gas sources would normally cause too small an amount of reducing gas to be fed to the further reduction zone, which leads to difficulties and may possibly cause the disruption of the continuously progressing direct reduction process in this further reduction zone. In accordance with the invention this is avoided by recycling at least a portion of the export gas from the further reduction zone.

If export gas from the further reduction zone is to be recycled, preferably said gas will first of all be pre-compressed in order to level out differences of pressure and pre-compressed and in the pre-compressed state will be admixed to the reducing gas from the intact gas source and subjected to further compression along with the same. In that case, compression of the recycled export gas to the pressure level required for the further direct reduction process takes place in stages, thus allowing it to get by with not too expensively designed compressors (in terms of capacity).

Other possible gas sources apart from a plant with a first reduction zone where iron ore is directly reduced to sponge iron and the sponge iron melted in a meltdown gasifying zone under the supply of carbon carriers and oxygen-containing gas would be coal gasification processes and blast furnace processes, so that at least one gas source could also be a coal gasification means or a blast furnace.

A plant for carrying out the method according to the invention, with a reduction reactor for producing sponge metal, in particular sponge iron, from charging materials consisting of metal ore or iron ore respectively, preferably in lumps and/or pellets, and optionally fluxes, with a reducing-gas feed duct and an ore feed duct leading to said reduction reactor, an export-gas discharge duct departing from this reduction reactor and a discharging means for the reduction product formed in said reduction reactor, wherein from a gas source dispensing a CO— and $H_2$-containing feedgas a feedgas duct conducting the feedgas dispensed by the gas source runs into the reducing-gas feed duct via a compressor and optionally a $CO_2$ elimination plant and optionally a gas heater, characterized in that at least a second gas source dispensing a CO— and $H_2$-containing gas likewise runs into the reducing-gas feed duct via a feedgas duct equipped with a compressor and optionally via a $CO_2$ elimination plant as well as optionally a gas heating plant and that a conveying duct for at least a portion of the export gas formed in the reduction reactor is adapted to be flow-connectable with the reducing-gas feed duct of the reduction reactor via the compressors, which are connectable in series via a connection duct, and via a $CO_2$ elimination plant and optionally a heating means.

The compressors that are anyway provided for the two gas sources being optionally switchable from a parallel to a serial connection, there is no need for a separate compressor for the recycled gas if recycling the export gas, so that enormous savings in terms of capital expenditures will result.

Herein suitably the two feedgas ducts departing from the gas sources can be cut off individually by means of valves prior to running into one each of the compressors and are connectable via a connection duct.

A preferred embodiment is characterized in that at least one gas source is formed by a first reduction reactor for iron ore, preferably in lumps and/or pellets, a melter gasifier, a feed duct for a reducing gas connecting the melter gasifier with the first reduction reactor, a conveying duct for the reduction product formed in the first reduction reactor connecting the first reduction reactor with the melter gasifier, an export-gas discharge duct departing from the first reduction reactor, feed ducts for oxygen-containing gases and carbon carriers opening into the melter gasifier and a tap for pig iron and slag provided at the melter gasifier, wherein the export-gas discharge duct departing from the first reduction reactor serves as a feedgas duct.

Preferably, two gas sources are formed in the same way by first reduction reactors having one melter gasifier each and through feedgas ducts are flow-connected with the reducing-gas feed duct of the further reduction reactor via one compressor each.

BRIEF DESCRIPTION OF THE DRAWINGS

In the following, the invention is explained in more detail with reference to an exemplary embodiment represented in the drawings, wherein;

FIG. 4 illustrates a possible embodiment of a gas source.

DETAILED DESCRIPTION OF THE INVENTION

Figure 1:
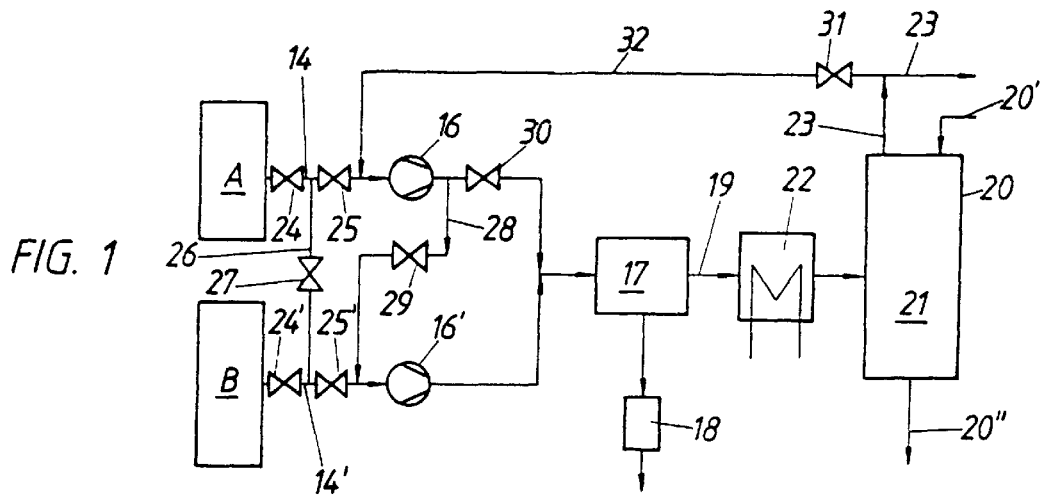
FIG. 1 is a block diagram illustrating a plant in accordance with the invention.

The two gas sources A and B represented in FIG. 1, which supply a feedgas, are preferably constructed as described below:

To a shaft furnace forming a first reduction reactor 1, lumpy iron ore and/or pelletized iron ore is top-charged via a conveying means 2 through a sluice system not illustrated in the drawing, optionally along with fluxing materials under the formation of a moving bed. The shaft furnace 1 communicates with a melter gasifier 3, in which from coal and oxygen-containing gas a reducing gas is formed which is fed to the shaft furnace 1 via a feed duct 4, a gas purification means 4' for dry dedustification being optionally provided inside the feed duct 4.

The term "moving bed" is generally understood to refer to a continuously moving material stream, the movable particles of which come into contact with a reducing gas flowing in the opposite direction. Preferably, a material stream is utilized which moves continuously downward by gravity.

Instead of a shaft furnace 1, it is also feasible to provide a reactor incorporating a Venturi-fluidized bed, a circulating fluidized bed, a fluidized bed or a reactor incorporating a traveling grate or a rotary tubular kiln as the reduction reactor.

The melter gasifier 3 has a feed duct 5 for solid carbon carriers, a feed duct 6 for oxygen-containing gases and optionally feed ducts 7 for carbon carriers that are liquid or gaseous at room temperature, such as hydrocarbons, and for calcined fluxes. Inside the melter gasifier 3, molten pig iron 9 and molten slag 10 collect below the meltdown gasifying zone 8 and are run off through a tap 11.

Along with the fluxes calcined in the direct reduction zone 12, the iron ore which has been reduced to sponge iron in a direct reduction zone 12 inside the shaft furnace 1 is introduced through a conveying duct 13 connecting the shaft furnace 1 with the melter gasifier 3, f.i. by means of delivery worms etc. To the upper portion of the shaft furnace 1, a duct 14 is connected for the export gas which forms from reducing gas in the direct reduction zone 12 and which is to serve as a feedgas for a further reduction process.

From each of the gas sources A and B exhibiting the above-described construction, export gas is withdrawn through the feedgas duct 14 (for gas source A) and 14' (for gas source B) and is first subjected to purification in a scrubber 15 to free it from dust particles as completely as possible and to reduce the water vapor content. By means of a gas compressor 16 (for gas source A) and 16' (for gas source B) the export gas subsequently passes into a $CO_2$ elimination plant 17 (f.i. a $CO_2$ scrubber or a pressure-swing adsorption plant) where it is freed from $CO_2$ as completely as possible.

As can be seen from FIG. 1, the gas sources A and B are arranged parallel to each other, with their feedgas discharge ducts 14, 14' uniting at a position after the compressors 16 and 16', so that the two feedgases from the gas sources A and B are supplied to $CO_2$ elimination in a mixed state. As a consequence, only a single $CO_2$ elimination plant 17 is required, which is advantageous particularly if the feedgases from the gas sources A and B are similar or equal in chemical composition.

The offgas exiting the $CO_2$ elimination plant 17 optionally is supplied to a desulphurizing plant 18. The feedgas thus purified from $CO_2$ is now available for a further reduction process. Through a reducing-gas feed duct 19 it is supplied to a second reduction reactor constructed as a shaft furnace 20, which like the first shaft furnace 1 is also provided with a moving bed and is operated in accordance with the counter-current principle. In this second shaft furnace 20 metal ore, preferably lumpy and/or pelletized iron ore, is directly reduced to sponge iron in a reduction zone 21. The ore feed duct is designated by the reference numeral 20' and the sponge iron discharging means by the reference numeral 20".

In the second shaft furnace 20 metal ores, such as manganese ore, lead ore and zinc ore, could also be subjected to partial or complete reduction.

Since the mixed feedgases of the gas sources A and B have experienced substantial cooling by $CO_2$ elimination, the reducing gas emerging from the $CO_2$ elimination plant is subjected to heating in a gas heater 22 prior to being fed to the second reduction shaft furnace 20. The reducing gas hereby reaches the temperature necessary for reduction in the second reduction shaft furnace 20, which lies in a temperature range of between 600 and 900° C. For reducing gases that are rich in $H_2$ even a temperature range of above 900° C. may be contemplated.

Depending on its intended use, the export gas withdrawn from the second reduction shaft furnace 20 through an export-gas duct 23 is also subjected to purification and cooling in an export gas scrubber (not illustrated) to clean it from dust particles and reduce the water vapor content, whereupon it is ready for feeding to a consumer.

Each of the feedgas ducts is provided with first valves 24, 24' and second valves 25, 25', all of which are arranged preceding the compressors 16. Between the first and second valves 24, 25 or 24', 25' respectively, a connection duct 26 is provided which links the feedgas ducts 14 and 14' of the two gas sources A and B and is fitted with a valve 27.

From the feedgas duct 14 of the gas source A, a further connection duct 28 linking the feedgas ducts 14, 14' departs at a position after the compressor 16, which duct is also fitted with a valve 29 and at a position before the compressor 16' of the other gas source B opens into the feedgas duct 14' of said gas source B, but at a position after the second valve 25' of the same. At a position after the branching-off point the export-gas duct 14, from which this further connection duct 28 branches off is fitted with an additional valve 30.

From the export-gas duct 27 of the further shaft furnace 20 a conveying duct 32 fitted with a valve 31 branches off to join the feedgas duct 14 of the gas source A at a position preceding the compressor 16 allocated to said source.

In the following, the functioning of the plant will be described:

If both gas sources supply feedgas for the further reduction plant, i.e. the further shaft furnace 20, on a roughly equal order (quantity, chemical composition), all valves of the feedgas ducts 14 and 14' will be open and the valve 31 of the conveying duct 32 serving for recycling an export gas formed in the further shaft furnace 20 as well as the valves 27 and 29 of the connection ducts 26 and 28 between the feedgas ducts 14 and 14' will be in a closed position.

Figure 2:
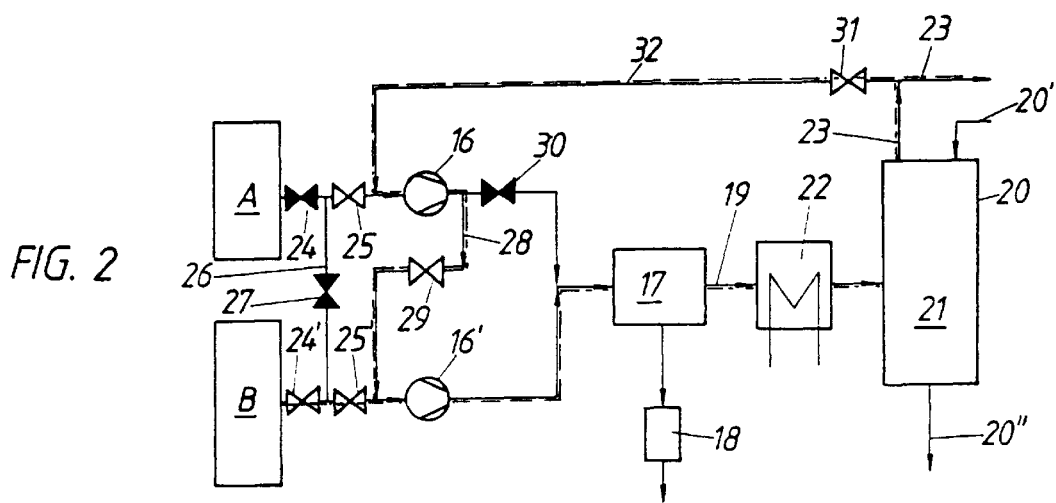
FIGS. 2 and 3 each explain the gas paths in the event of a breakdown of one of the gas sources.

In the event that the gas source A breaks down-this is illustrated in FIG. 2, a portion of the export gas formed in the further shaft furnace 20 will be fed to the feedgas duct 14 through the conveying duct 32 after opening the valve 31 of the latter. Here, the recycled export gas f.i. exhibits a pressure above atmospheric of roughly 0.3 bar. The recycled export gas via the compressor 16 and the connection duct 28 branching off from the feedgas duct 14 at a position after the compressor 16 is conducted to the compressor 16' allocated to the other intact gas source B an d is mixed wit h the feedgas from the gas source B and compressed by means of the compressor 16' allocated to said gas source B. The initial compression is effected f.i. to roughly 1.5 bar pressure above atmospheric and the second compression by means of the compressor 16' will then be effected to the pressure above atmospheric of f.i. roughly 3 bar which is necessary for the shaft furnace 20. Here, the valves 24, 30, 27 sketched in black in FIG. 2 are closed and the valves 31, 24', 25' and 29 are open. In FIG. 2 (and also in FIG. 3), the flow path of the gas has been illustrated in broken lines.

Figure 3:
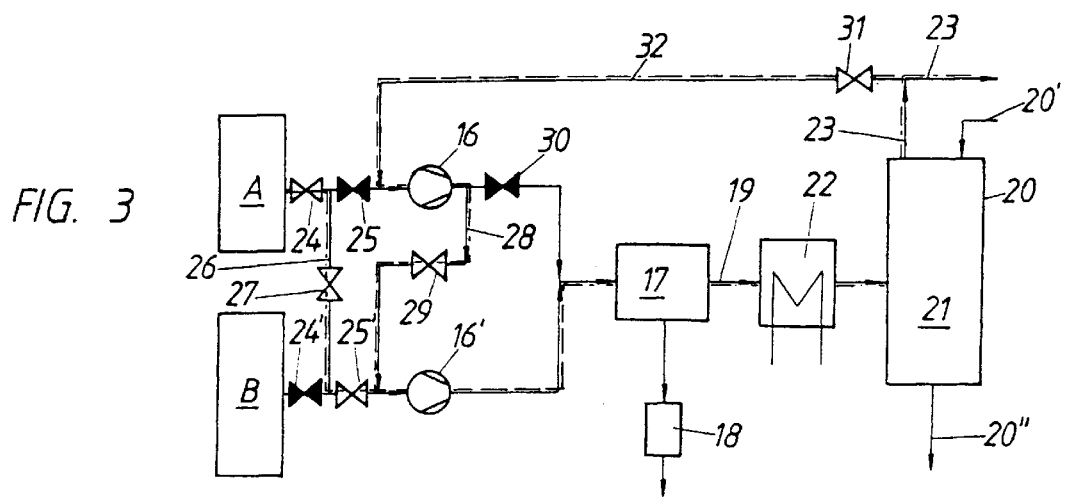

If there is a breakdown of gas source B, as illustrated in FIG. 3, then the export gas recycled from the further shaft furnace 20 will also be supplied to the gas source B via the further connection duct 28 of the feedgas duct 14' and the feedgas from the gas source A will also be fed into the feedgas duct 14' of the gas source B via the first connection duct 26. During this time, the valves 25, 30, 24' are in a closed position and the valves 31, 24, 27, 29 and 25' are open.

Depending on the shaft capacity of the reduction reactor 20 and the actual dimensions of the compressors 16, 16' up to 100% of the export gas available can be recycled, yet in doing so the inert gas portion must be taken into account.

The invention is not limited to the exemplary embodiment illustrated in the drawing but also encompasses further embodiments. The essential requirement here is that the two compressors 16, 16' must be constructed so as to be connectable in parallel with respect to gas distribution whenever the two gas sources A and B are in operation at the same time and connectable in series in case of a breakdown of one of the two gas sources A and B. The foregoing also applies to the compressors allocated to each gas source if more than two gas sources are utilized.

What is claimed is:

1. A method for producing a sponge metal from metal ore or iron ore which comprises reacting said metal ore or iron ore in a first reduction zone with a CO— and $H_2$-containing, reducing feed gas source which has been compressed, and after said reaction, withdrawing the reducing feed gas as export gas from the first reduction zone, wherein the CO— and $H_2$-containing feed gas is introduced into the first reduction zone from at least two gas sources, whereby upon a breakdown of one of the feed gas sources, at least a portion of the export gas recovered from the first reduction zone is compressed, subjected to $CO_2$ elimination and recycled to the first reduction zone together with the reducing feed gas.

2. The method according to claim 1, wherein after being compressed, the export gas is admixed with the intact feed gas source and further compressed with said feed gas source.

3. The method according to claim 1, wherein at least one of the gas sources is formed in a first reduction zone in which iron ore is directly reduced to sponge iron, wherein the sponge iron is melted in a meltdown-gasifying zone in the presence of carbon carriers and an oxygen-containing gas, whereby a CO— and $H_2$-containing reducing gas is produced which is fed into said first reduction zone where it is reacted and drawn off as a feed gas for introduction into the first reduction zone, said feed gas being compressed and treated to eliminate $CO_2$ prior to being fed into the first reduction zone.

4. The method of claim 1, wherein in addition to being compressed and treated to eliminate $CO_2$, the feed gas is also heated.

5. The method according to claim 1, wherein at least one of the gas sources is formed by coal gasification.

6. The method according to claim 1, wherein at least one of the gas sources is formed in a blast furnace.

7. The method of claim 1, wherein the sponge metal is sponge iron.

8. The method of claim 1, wherein the metal ore or iron ore exists in lumps, in pellets or fluxes.

9. The method of claim 1, wherein the reducing feed gas is heated and treated to remove $CO_2$ therefrom.

10. The method of claim 1, wherein the export gas is first heated and subsequently reintroduced into the first reduction zone.

* * * * *